US007640248B2

(12) United States Patent
Nakamura

(10) Patent No.: US 7,640,248 B2
(45) Date of Patent: Dec. 29, 2009

(54) CONTENT-INFORMATION MANAGEMENT SYSTEM, CONTENT-INFORMATION MANAGEMENT APPARATUS, CONTENT-INFORMATION MANAGEMENT METHOD, AND COMPUTER PROGRAM

(75) Inventor: Junichi Nakamura, Chiba (JP)

(73) Assignee: Sony Corporation, Tokyo (JP)

( * ) Notice: Subject to any disclaimer, the term of this patent is extended or adjusted under 35 U.S.C. 154(b) by 288 days.

(21) Appl. No.: 11/353,388

(22) Filed: Feb. 14, 2006

(65) Prior Publication Data

US 2006/0195553 A1 Aug. 31, 2006

(30) Foreign Application Priority Data

Feb. 16, 2005 (JP) ............................. 2005-039868

(51) Int. Cl.
G06F 17/30 (2006.01)
(52) U.S. Cl. ................. 707/10; 707/1; 707/2; 707/100; 707/200
(58) Field of Classification Search .................. 707/10, 707/100, 1, 2, 200; 705/59, 57; 709/203, 709/217–219, 223; 725/51
See application file for complete search history.

(56) References Cited

U.S. PATENT DOCUMENTS

| 5,704,060 | A * | 12/1997 | Del Monte ............... 707/104.1 |
| 5,793,966 | A * | 8/1998 | Amstein et al. ............ 709/203 |
| 6,747,343 | B2 * | 6/2004 | Tellkamp .................... 257/666 |
| 7,016,831 | B2 * | 3/2006 | Suzuki et al. ............... 704/203 |
| 7,155,305 | B2 * | 12/2006 | Hayes et al. ................ 700/224 |
| 2001/0005906 | A1 * | 6/2001 | Humpleman ................. 725/82 |
| 2002/0052719 | A1 * | 5/2002 | Alexander et al. .......... 702/188 |
| 2002/0053085 | A1 * | 5/2002 | Toguri ......................... 725/51 |
| 2002/0073167 | A1 * | 6/2002 | Powell et al. ............... 709/217 |
| 2002/0116407 | A1 * | 8/2002 | Negishi et al. .............. 707/203 |
| 2002/0120574 | A1 * | 8/2002 | Ezaki ........................... 705/51 |
| 2002/0133491 | A1 * | 9/2002 | Sim et al. ...................... 707/10 |
| 2002/0186412 | A1 * | 12/2002 | Murashita .................. 358/1.16 |

(Continued)

FOREIGN PATENT DOCUMENTS

JP 5 150868 6/1993

(Continued)

OTHER PUBLICATIONS

"Application and Scenarios of RFID technology"—Martin Schneider and Jens Brauner—Seminar "Datenschutzaspekte im Umfeld des Pervasive Computing"—2004 (pp. 1-30).*

(Continued)

Primary Examiner—John E Breene
Assistant Examiner—Anh Ly
(74) Attorney, Agent, or Firm—Frommer Lawrence & Haug LLP; William S. Frommer; Thomas F. Presson

(57) ABSTRACT

A content-information-management system that includes a meta-information server which handles meta information of contents on a network on which at least one content-providing device which provides the contents. The meta-information server provides the meta information to a content-use device which uses the contents. The meta-information server determines the content-providing device on the network, acquires and stores the meta information of the contents provided by the content-providing device, and transmits the meta information of the contents according to a request for the contents, the request being made by the content-use device.

28 Claims, 9 Drawing Sheets

U.S. PATENT DOCUMENTS

| | | | |
|---|---|---|---|
| 2003/0028539 A1* | 2/2003 | Nunome et al. | 707/10 |
| 2003/0088573 A1* | 5/2003 | Stickler | 707/100 |
| 2003/0106071 A1* | 6/2003 | Akamatsu et al. | 725/139 |
| 2003/0154217 A1* | 8/2003 | Kinno et al. | 707/104.1 |
| 2004/0092271 A1* | 5/2004 | Viikari et al. | 455/456.2 |
| 2004/0167872 A1* | 8/2004 | Shteyn | 707/1 |
| 2004/0168062 A1* | 8/2004 | Isozaki et al. | 713/171 |
| 2004/0192195 A1* | 9/2004 | Soga et al. | 455/11.1 |
| 2004/0254851 A1* | 12/2004 | Himeno et al. | 705/26 |
| 2004/0255235 A1* | 12/2004 | Jung et al. | 715/500.1 |
| 2004/0266458 A1* | 12/2004 | Kataoka | 455/456.5 |
| 2005/0015805 A1* | 1/2005 | Iwamura | 725/79 |
| 2005/0021309 A1* | 1/2005 | Alexander et al. | 702/188 |
| 2005/0022236 A1* | 1/2005 | Ito et al. | 725/39 |
| 2005/0028191 A1* | 2/2005 | Sullivan et al. | 725/28 |
| 2005/0050181 A1* | 3/2005 | Morioka | 709/223 |
| 2005/0055378 A1* | 3/2005 | Isobe | 707/104.1 |
| 2005/0080764 A1* | 4/2005 | Ito | 707/1 |
| 2005/0120372 A1* | 6/2005 | Itakura | 725/46 |
| 2005/0136946 A1* | 6/2005 | Trossen et al. | 455/456.2 |
| 2005/0138661 A1* | 6/2005 | Matsukawa | 725/62 |
| 2005/0141864 A1* | 6/2005 | Sezan et al. | 386/69 |
| 2005/0149850 A1* | 7/2005 | Negishi et al. | 715/500 |
| 2005/0182791 A1* | 8/2005 | Lim et al. | 707/104.1 |
| 2005/0183089 A1* | 8/2005 | Negishi et al. | 719/310 |
| 2005/0187880 A1* | 8/2005 | Ezaki | 705/59 |
| 2005/0221812 A9* | 10/2005 | Gailey et al. | 455/422.1 |
| 2005/0256880 A1* | 11/2005 | Koong et al. | 707/10 |
| 2006/0136443 A1* | 6/2006 | Dulay et al. | 707/101 |
| 2007/0038950 A1* | 2/2007 | Taniguchi et al. | 715/501.1 |

FOREIGN PATENT DOCUMENTS

| | | |
|---|---|---|
| JP | 2000 148632 | 5/2000 |
| JP | 2001 223955 | 8/2001 |
| JP | 2003 216620 | 7/2003 |
| JP | 2003 308263 | 10/2003 |
| JP | 2004 272632 | 9/2004 |
| JP | 2005 38120 | 2/2005 |
| WO | WO 02/091737 A1 * | 11/2002 |
| WO | WO 03/007291 A1 * | 1/2003 |

OTHER PUBLICATIONS

"A Feasibility Study of new RFID Applications"—Trond Henning Johansen & Ornulf Storm—Grimstad, Jun. 2004 (pp. 1-99).*

"Applications of RFID technology"—Raza. N, Bradshaw, V. and Hague, M.—RFID Technology (Ref. No. 1999/123) IEEE Colloquium on, 1999 (pp. 1/1-1/5.*

* cited by examiner

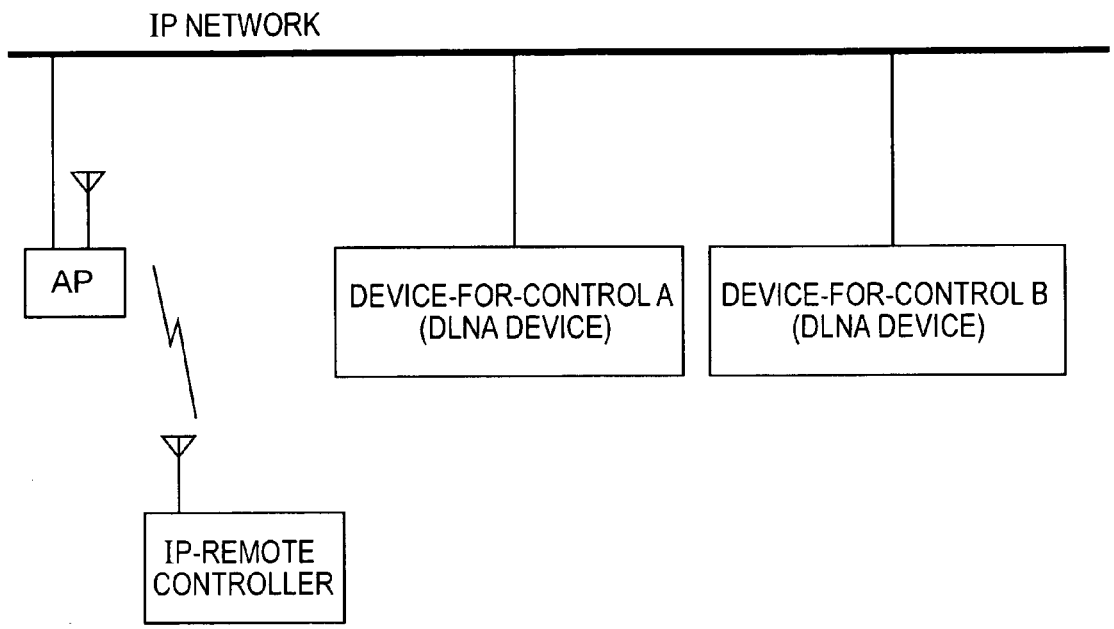
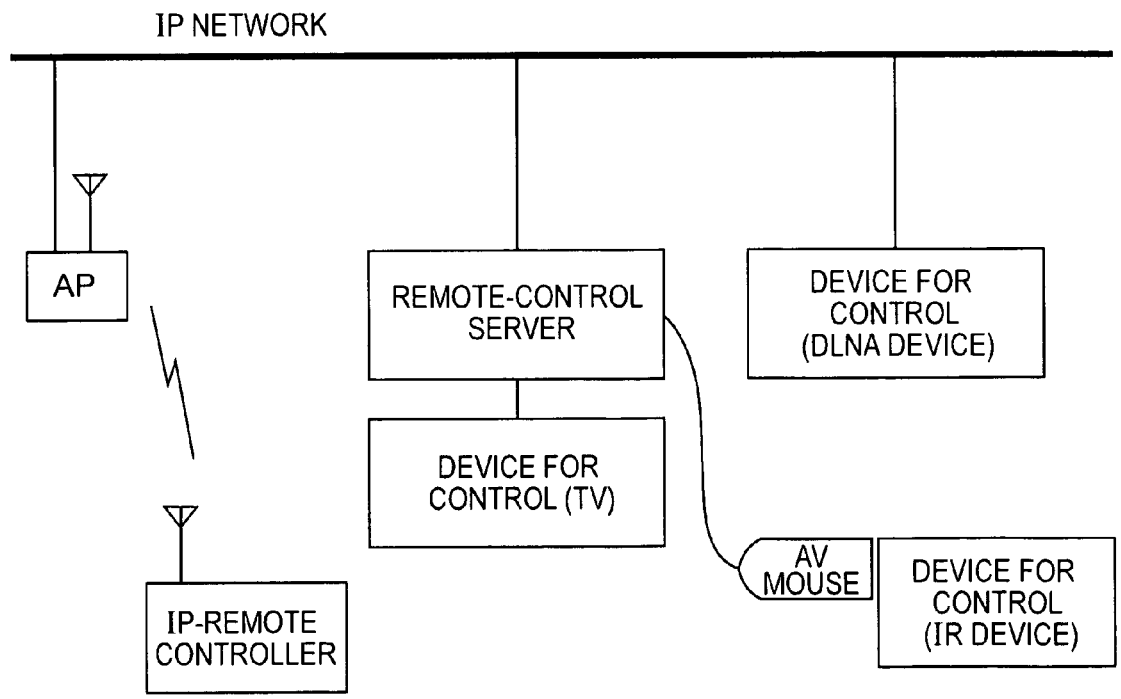

CONTENT-INFORMATION MANAGEMENT SYSTEM, CONTENT-INFORMATION MANAGEMENT APPARATUS, CONTENT-INFORMATION MANAGEMENT METHOD, AND COMPUTER PROGRAM

CROSS REFERENCES TO RELATED APPLICATIONS

The present invention contains subject matter related to Japanese Patent Application JP 2005-39868 filed in the Japanese Patent Office on Feb. 16, 2005, the entire contents of which are incorporated herein by reference.

BACKGROUND OF THE INVENTION

1. Field of the Invention

The present invention relates to a content-information-management system, a content-information-management apparatus, a content-information-management method, and a computer program that are adapted to manage information relating to usable contents on a home network having a content-reproduce device configured to reproduce and output audio-and-visual (AV) contents, such as a monitor display and a sonic-reproduction device, at least one content-provide device configured to receive broadcast contents, such as a tuner and a CD-and-DVD player, and a content-record device configured to record externally transmitted contents, and particularly relates to a content-information-management system, a content-information-management apparatus, a content-information-management method, and a computer program that are adapted to achieve a list function relating to contents provided by the at least one content-provide device on the home network.

More specifically, the present invention relates to a content-information-management system, a content-information-management apparatus, a content-information-management method, and a computer program that achieve the function of providing first information which is used by a content-use device configured to use contents provided on the home network, so as to obtain desired contents, and particularly relates to a content-information-management system, a content-information-management apparatus, a content-information-management method, and a computer program which provide first information used by the content-use device, so as to obtain desired contents irrespective of the state of the content-provide device storing the desired contents.

2. Description of the Related Art

Recently, various types of AV devices including a TV receiver, a video recording-and-reproducing device, and so forth are developed and manufactured, and widely used in households and/or other living spaces. Each of the above-described AV devices operates, as a content-provide device which provides contents acquired via a transportable medium including a compact disk (CD), a digital versatile disk (DVD), and so forth, or contents received by using a broadcast wave selected by performing tuning. In another case, each of the AV devices operates, as a content-reproduce device configured to output and produce contents including image data and/or speech data, the contents being provided by the content-provide device, as an image and/or speech.

Further, as the information-communication technology progresses, home networks adapted to connect home-information appliances to one another are increasingly used in many households. By using the home network, a user is allowed to enjoy contents provided by an arbitrary content-provide device via a content-reproduce device installed in a desired room.

At present, increasing numbers of digital contents of various types are available. Subsequently, it is expected that the demand for obtaining the digital contents through a personal computer (PC), a mobile device, an AV device, and so forth, and enjoying the contents will increase. For example, Digital Network Living Alliance (DLNA) proposes a network configured to connect electronic devices, for example, to one another seamlessly so that a user can enjoy contents at any place in a house and through any electronic device easily and conveniently. According to the configuration of the network, data such as AV contents may be stored in any device on the network. Subsequently, the user can enjoy contents irrespective of the place where the contents are stored. For example, the user can enjoy contents stored in a device installed in a room some distance from the user's room, which is highly convenient for the user.

It is expected that increasing numbers of DLNA-capable devices will become available and network-capable AV devices will be widely used. If the network-capable devices increases, it becomes possible to perform remote-control operations for the AV devices by using an IP network under a weak constraint relating to directivity and/or a communication area, although remote control for the AV devices were performed by using infrared communications in the past. The above-described DLNA-related technology is disclosed in Japanese Patent Application No. 2005-17435, for example. According to the above-described IP remote-control system, bidirectional communications can be performed between an IP-remote controller and an AV device for control. Therefore, it becomes possible to perform communications with stability by transmitting a transmission-confirmation signal, operating a sophisticated command system by performing graphical-user-interface (GUI) operations, and perform high-capacity data transmission such as video streaming by using a relatively large frequency band.

Thus, the DLNA technology allows for connecting a plurality of network-capable AV devices which provides digital contents of various types to one another so that the user can use the AV devices on the home network. Further, the DLNA technology presents the list function which allows the user to see contents stored in each of the content-provide devices provided on a DLNA network, as if the contents were stored in a single device. Subsequently, the user can enjoy desired contents immediately without being worried about where the contents really are.

Usually, a user turns off the power of an electronic device which is not used and turns on the power when the user wants to use the electronic device. Recently, the above-described power control is particularly important in view of socioecology which proposes the concept of resource finiteness. However, when the power of an AV device is turned off, it is difficult for the user to refer to contents provided by the above-described AV device with its power turned off via a network. Thus, the above-described known technology does not allow the user to see all the contents provided on the home network at a glance.

If all the contents provided by the AV devices installed on the home network are stored in a predetermined content-provide server, the user can see all the contents at a glance through the content-provide server even after the power of each of other AV devices is turned off, for example.

However, since the content-provide server is expensive, the cost of performing the above-described method of unitarily controlling all the contents by using the content-provide server increases. Further, the use of the content-provide server puts the entire system under restraint when an AV device which provides contents is added and/or contents provided to the user are added. Namely, the flexibility of the entire system decreases due to the use of the content-provide server.

There have been proposed methods for managing contents on the basis of identification information of the contents stored in the content-provide server. One of the above-described methods is disclosed in Japanese Unexamined Patent Application Publication No. 2004-234158, for example. In that case, the content-provide server determines the unique-identifier information corresponding to the contents to be an element of the meta data corresponding to the contents, and sets the element, as property information. Although the contents stored in a storage unit is physically changed, or the position where the contents are stored is physically changed, the content-provide server maintains the unique-identifier information, as the meta data corresponding to the contents, and manages the unique-identifier information, as the meta data corresponding to transmitted contents without changing the value of the unique-identifier information which is set, so as to correspond to the transmitted contents. According to the above-described configuration, it becomes possible for a client to acquire contents on the basis of unique-identifier information, even though the contents are moved between at least two servers.

SUMMARY OF THE INVENTION

The present invention provides a content-information-management system, a content-information-management apparatus, a content-information-management method, and a computer program that can achieve a list function relating to contents provided by at least one content-provide device provided on a home network.

The present invention further provides a content-information-management system, a content-information-management apparatus, a content-information-management method, and a computer program that can achieve a function of providing first information used for obtaining desired contents. The first information is used by a content-use device which uses contents provided on the home network.

The present invention further provides a content-information-management system, a content-information-management apparatus, a content-information-management method, and a computer program that can provide first information used by a content-use device so that the content-use device can obtain desired contents, irrespective of the state of a content-provide device which stores the desired contents.

Therefore, a content-information-management system according to an embodiment of the present invention includes a meta-information server which handles meta information of contents on a network on which at least one content-provide device which provides contents is provided. The meta-information server provides the meta information to a content-use device which uses the contents. The meta-information server discovers the at least one content-provide device on the network, acquires and stores the meta information of the contents provided by each of the at least one discovered content-provide device, and transmits the meta information of the contents according to a request for the contents, the request being made by the content-use device.

Hereinafter, the above-described term "system" denotes a logical aggregation of a plurality of devices and/or functional modules configured to achieve a predetermined function. The above-described devices or functional modules may be provided in a single cabinet.

Further, the use of contents indicates data processing such as content reproduction and/or content recording.

As the network technology becomes widely available, increasing numbers of network-capable AV devices or the like are used. For example, a content-reproduce device including a monitor display configured to reproduce and output AV contents, a sonic-reproduction device (an AV amplifier), and so forth, a content-provide device including a tuner configured to receive broadcast contents and provide the received broadcast contents on the home network, a CD-and-DVD player configured to provide contents accumulated on a medium, and so forth, and a content-record device configured to record contents externally transmitted, such as broadcast contents, are provided on the home network. When the network-capable AV devices which provide contents are connected to one another, it becomes possible to use a group of the above-described AV devices on the home network.

Most of the AV devices can be remotely controlled by using an infrared (IR) remote controller. However, as increasing numbers of AV devices become network capable, it is preferable to perform remote-control operations by using an IP network under little restraint relating to a directivity and/or communicable area. According to the above-described IP remote-control system, bidirectional communications can be performed between the IP-remote controller and an AV device which is operated. Therefore, it becomes possible to perform communications with stability by transmitting a transmission-confirmation signal, operating a sophisticated command system using graphical-user-interface (GUI) operations, and perform high-capacity data transmission by using a relatively large frequency band.

According to the above-described remote-control system using the IP-remote controller, a remote-control server configured to receive a command signal transmitted from the IP-remote controller, as an unwired LAN signal, via an access point, transmits the command signal to an AV device for control via a wired local-area network (LAN). Further, the remote-control server can return contents and/or the meta information of the contents acquired from the AV device from the access point to the IP-remote controller.

Usually, a user turns off the power of an electronic device which is not used and turns on the power when the user wants to use the electronic device. In that case, however, when the power of the electronic device is turned off, it is difficult for the user to refer to contents provided by the above-described electronic device via the home network. Thus, the user is hindered to see all the contents provided on the home network at a glance.

However, in the above-described content-information-management system according to the embodiment of the present invention, a configuration adapted to manage meta information of contents is provided independently of the content-provide device. For example, a remote-control server or the like functions, as a meta-information server adapted to manage meta information of contents provided on the network so that the meta information is managed independently of the contents. That is to say, the remote-control server discovers the content-provide device on the home network, acquires meta information about contents provided by the discovered content-provide device, and transmits the meta information in response to a request transmitted from the content-use device such as the IP-remote controller.

The meta-information server which stores meta information of contents can provide first information which allows a user to obtain desired contents. In that case, it becomes possible to provide the meta information within the system irrespective of the state of the content-provide device storing the desired contents. Subsequently, it becomes possible to provide the desired contents only by activating minimum part of the system.

On a home network using the technology according to an embodiment of the present invention, the content-use device which uses contents makes an inquiry to the meta-information server such as a remote-control server, so as to unitarily use content information provided on the home network.

Therefore, the IP-remote controller which functions, as the content-use device, can achieve the function of seeing the contents provided on the home network at a glance, when the IP-remote controller makes a request for the meta information of predetermined contents. At that time, the content-provide device connected to the home network may not be energized at all time.

The meta-information server which unitarily manages the meta information on the home network starts performing device-discovery processing for the content-provide device on the home network according to a request for the meta information, the request being transmitted from the content-use device, and acquires the meta information. Of course, the meta-information server may perform the device-discovery processing at predetermined time intervals and make a request for the meta information on an autonomous basis, so as to update the meta information at all times.

If no device-discovery response is transmitted from the content-provide device, the meta-information server transmits meta information that was acquired from the content-provide device in the past and that is stored to the content-use device. Subsequently, the contents provided on the home network can be seen at a glance irrespective of the state of the content-provide device.

Further, the meta-information server which unitarily manages the meta information on the home network includes information about a list of at least one content-provide device, the list information being provided, so as to manage the content-provide device which transmits a device-discovery response for a device-discovery request and the state of the content-provide device.

In response to a request for contents, the request being made by the content-use device, the meta-information server makes a request for the contents, in response to the content-request made by the content-use device, by determining the content-provide device which provides the contents on the basis of the meta information of the contents for which the content request is made.

When the meta-information server transmits a request for the contents to the content-provide device, the meta-information server confirms the state of the content-provide device by referring to the list information. When the power of the content-provide device which is a destination of the content request is shut down, the content request is transmitted after predetermined start processing is performed.

The above-described start processing may be device-wake-up processing performed via a network, or producing a prompt, so as to make the user perform an operation manually. When the content-provide device can be remotely controlled by using an IR-remote-control system, a command signal used for IR communications such as SIRCS may be transmitted by optical communications. If a device for control is on a blind spot from the stand point of the remote-control server and/or the distance between the device for control and the remote-control server is long, when an IR-command signal is transmitted, it may be configured that the infrared-command signal is transmitted in the vicinity of the device for control through optical communications by using an extension cord such as an AV mouse.

A computer-readable computer program according to another embodiment of the present invention is adapted to make a computer system execute predetermined processing, so as to handle meta information relating to contents on a network on which at least one content-provide device which provides the contents is provided. The predetermined processing includes the step of discovering the at least one content-provide device provided on the network, acquiring and storing the meta information of the contents provided by each of the at least one discovered content-provide device, and transmitting and providing the meta information stored at the meta-information-acquisition step according to a request for the contents, the request being made by a content-use device which uses the contents.

The above-described computer program is a computer-readable computer program which makes a computer system execute predetermined processing. That is to say, by installing the above-described computer program on the computer system, a synergy effect is produced on the computer system. Namely, the computer program can operate, as the meta-information server which unitarily manages information about contents in the above-described content-information-management system, which produces the same effect as that produced by the above-described content-information-management system.

As has been described, the present invention provides a content-information-management system, a content-information-management apparatus, a content-information-management method, and a computer program that can achieve a list function relating to contents provided by at least one content-provide device on a home network.

Further, the present invention provides a content-information-management system, a content-information-management apparatus, a content-information-management method, and a computer program which can provide first information used by the content-use device, so as to obtain desired contents irrespective of the state of the content-provide device storing the desired contents.

Further, the present invention provides a remote-control system wherein the meta-information server such as a remote-control server stores meta information of contents and provides first information used by a user, so as to obtain desired contents. Therefore, by introducing a configuration adapted to manage meta information of contents independently of the content-provide device, it becomes possible to provide the meta information within the system irrespective of the state of the content-provide device storing the desired contents. Subsequently, it becomes possible to provide desired contents only by activating minimum part of the system.

On a home network using the technology according to an embodiment of the present invention, the content-use device such as the IP-remote controller which uses contents makes an inquiry to the meta-information server such as the remote-control server, so as to unitarily use content information provided on the home network.

On the above-described home network, there is no need to energize the content-provide device connected to the home network at all time, so as to achieve the function of seeing contents provided on the home network at a glance.

Further, on the above-described home network, high-capacity contents can be distributed over a plurality of the content-provide devices so that the contents are stored in the content-provide devices. Therefore, it becomes possible to construct a network with flexibility and add another content-provide device without difficulty.

There is a close affinity between the technologies according to embodiments of the present invention and a system adapted to add meta information of contents. For example, there have been proposed systems adapted to extract a characteristic scene from video contents, as a thumbnail image, and/or a tune from musical contents, and manage the meta information including a video title, a track name, and so forth. The technologies of the present invention can be used in combination with the above-described systems, so as to achieve a system which selects (retrieves) contents desired by a user on the basis of meta information of the contents.

Other features and advantages of the present invention will be clearly illustrated in detail with reference to embodiments of the present invention and the attached drawing, as below.

BRIEF DESCRIPTION OF THE DRAWINGS

FIG. 9 illustrates a remote-control-operation system which operates on a home network; and FIG. 10 illustrates another remote-control-operation system which operates on the home network.

DESCRIPTION OF THE PREFERRED EMBODIMENT

Hereinafter, embodiments of the present invention will be described in detail with reference to the attached drawings.

Figure 1:
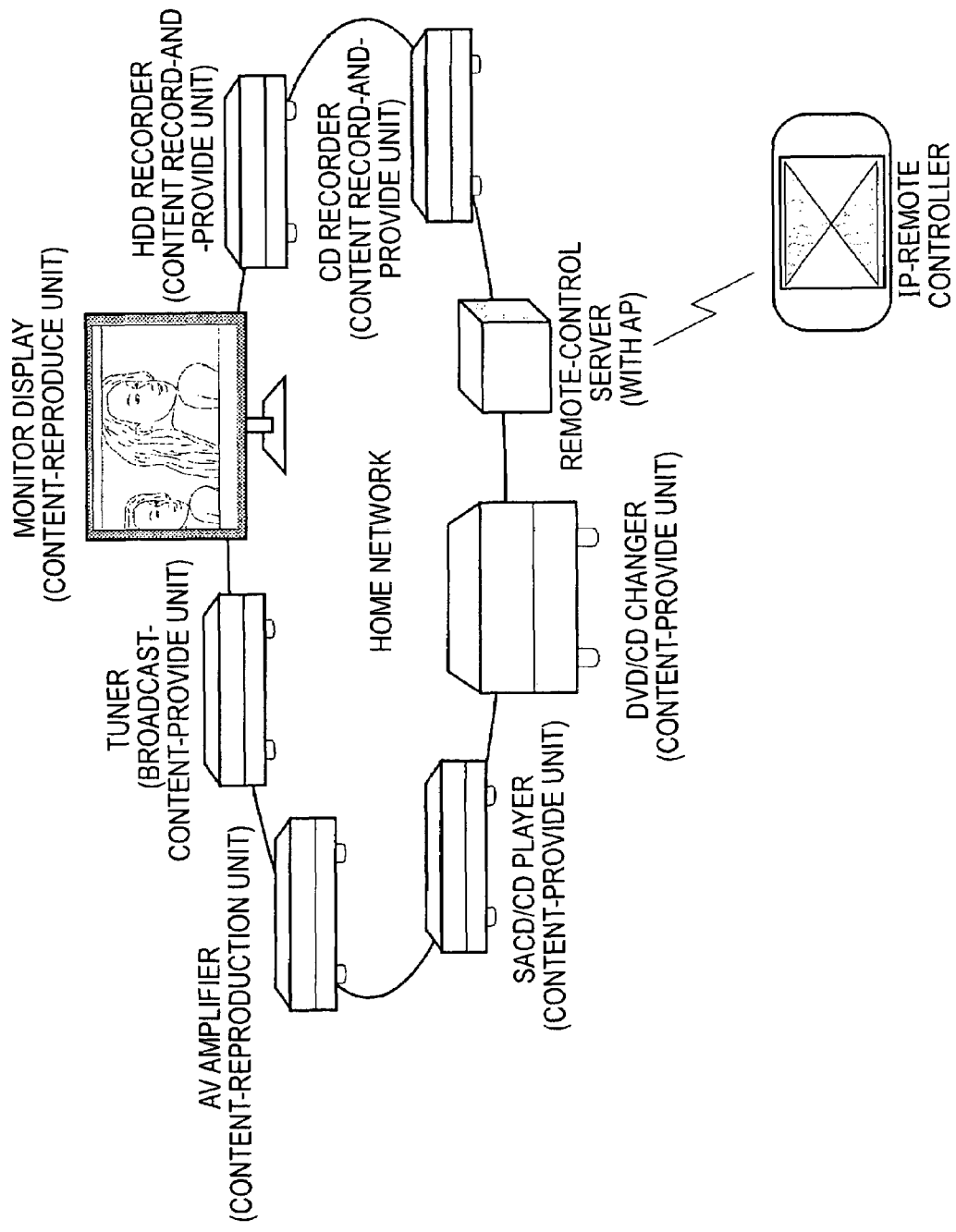
FIG. 1 schematically shows the configuration of a home network according to an embodiment of the present invention.

FIG. 1 is a schematic diagram of a home network according to an embodiment of the present invention.

A plurality of network-capable audio-and-visual devices are provided on the home network shown in FIG. 1. A remote commander using an internet-protocol (IP) network in place of an infrared (IR)-transmission path, or in addition to the IR-transmission path is structured, so as to remotely control the above-described AV devices. Here, the term "remote commander" denotes a remote-control system using an IP-remote controller.

By using the IP-remote-controller, it becomes possible to perform a remote-control operation by using a communication medium under a weak constraint relating to a directivity and/or communicable area. Further, since bidirectional communications can be performed between the IP-remote controller and a device for control on the IP network, a transmission-confirmation (response) signal can be transmitted therebetween. Therefore, many technical advantages can be obtained. Namely, it becomes possible to perform communications with stability, handle a sophisticated command system by performing a graphical-user-interface (GUI) operation, and perform high-capacity-data transmission such as video streaming by using a relatively large frequency band. For example, a TV receiver controlled by the IP-remote controller can transmit data on video such as a child screen transmitted thereto to the IP-remote controller via the IP network so that a user can enjoy the child screen produced on a display screen provided on the IP-remote controller. The above-described technology is disclosed in Japanese Unexamined Patent Application Publication No. 2005-17435, for example.

The above-described AV devices under the control of the IP-remote controller includes a content-reproduce device including a monitor display configured to reproduce and output AV contents, a sonic-reproduction device (an AV amplifier), and so forth, a content-provide device including a tuner configured to receive broadcast contents and provide the received broadcast contents on the home network, a CD-and-DVD player configured to provide contents accumulated on a medium, and so forth, and a content-record device configured to record contents which is externally transmitted, such as broadcast contents. Each of the above-described content-reproduce device, content-provide device, and content-record device includes the function of receiving and processing an infrared command, and a network interface. The above-described content-reproduce device, content-provide device, and content-record device are connected to one another via an IP-network (LAN) including IEEE 802.3 (Ethernet (Registered Trademark)). A device that can be controlled by a command signal transmitted from the IP-remote controller via a network may be a DLNA-compliant home appliance (hereinafter referred to as a DLNA device), for example. Of course, when a remote-control command flowing through the IP network is changed into an IR-command signal by a remote-control server or the like that will be described later, a known home appliance having no network function can be controlled by the IP-remote controller.

The IP-remote controller includes a radio-network interface, so as to transmit a control command. Subsequently, the IP-remote controller can communicate with an access point (AP) via a radio network constructed by IEEE 802. 11 a/b/g, for example. Since the AP is connected to the IP network, bidirectional communications can be performed between the IP-remote controller and the device for control via the AP. Therefore, it is possible to transmit a remote-control command via the IP network and/or receive data transmitted from the device for control.

Further, the IP-remote controller may include a display unit such as a liquid-crystal display (LCD) so that video data transmitted from devices A and B for control through streaming distribution via the IP network can be reproduced, for example. The above-described technology is disclosed in Japanese Unexamined Patent Application Publication No. 2005-17435, for example.

In the home-network system shown in FIG. 1, a remote-control server is provided between the IP-remote controller and the DLNA devices for control. The remote-control server is connected to the DLNA device such as a TV receiver controlled by the IP-remote controller, or integrated into the DLNA device.

According to the first embodiment, the remote-control server has a wired-LAN-communication function such as Ethernet (Registered Trademark), receives a command signal transmitted from the IP-remote controller via the AP through the IP network, that is, a local-area network (LAN), and transmits an operation command to a device controlled by the IP-remote controller. When the device for control also has the wired-LAN-communication function, the remote-control server transmits an operation-command signal transmitted from the IP-remote controller via the LAN.

Further, for a device that has no LAN-communication function and that can be remotely controlled only by a known (legacy) infrared (IR) remote-control system (hereinafter referred to as an IR device), the remote-control server converts the operation-command signal transmitted from the IP-remote controller via the LAN into a signal in a command format used for IR communications such as serial infrared remote control system (SIRCS), and performs optical communications. If the IR device for control is on a blind spot from the stand point of the remote-control server transmitting an infrared-command signal, and the distance between the IR device and the remote-control server is long, it may be configured that the infrared-command signal is transmitted in the vicinity of the IR device through optical communications by using an extension cord such as an AV mouse. The above-described AV mouse is disclosed in Japanese Unexamined Application Publication No. 2001-223955 that had already been assigned to the applicant of the present invention.

Further, when the remote-control server is connected to or integrated into a TV receiver and/or a device functioning as a source of AV contents, the remote-control server can also function, as a content-distribution server which distributes the above-descried AV contents (or contents of different types) to the IP-remote controller. For example, when the remote-control server is connected to the TV receiver, an audio signal and/or a video signal transmitted from the TV receiver is converted by an AV codec and transmitted to the IP-remote controller via the LAN through streaming distribution, or recorded contents are transmitted from a hard-disk (HDD) recorder connected to the remote-control server via the LAN, converted by the AV codec, and transmitted to the IP-remote controller via the LAN through the streaming distribution.

Further, the remote-control server according to the first embodiment functions, as a meta-information server which unitarily manage meta information, that is, information about contents that can be used on the home network, provided by each of the content-provide devices on the home network. Therefore, when the IP-remote controller uses contents provided by the content-providing device, the remote-control server can achieve a list function relating to the contents. The details on the meta-information-server function of the remote-control server will be described later.

FIG. 9 illustrates a remote-control operation system which operates on the home network system of the first embodiment. In this drawing, the devices A and B controlled by the IP-remote controller are provided in two different rooms, respectively, and both the devices do not enter an infrared-ray-arrival area at the same time. Each of the devices A and B for control includes a network interface, and the devices A and B are connected to each other via the IP network. Therefore, bidirectional communications can be performed between the IP-remote controller and the devices A and B for control via the AP, that is, the remote-control server. Subsequently, it becomes possible to transmit a remote-control-command signal via the IP network and/or receive data from the devices A and B for control.

Further, FIG. 10 illustrates another example remote-control operation system on the home network of the first embodiment. An essential difference between the remote-control system shown in FIG. 10 and that shown in FIG. 9 is that at least one device which is not capable of a network is provided in the remote-control operation system shown in FIG. 10, as a device controlled by the IP-remote controller.

The remote-control server is connected to the DLNA device such as a TV receiver mainly controlled by the IP-remote controller, or integrated into the DLNA device. The remote-control server receives a command signal transmitted from the IP-remote controller and transmits an operation command signal to the device controlled by the IP-remote controller. When the device for control also has a LAN-communication function, the remote-control server transmits an operation-command signal transmitted from the IP-remote controller via the LAN to the device for control.

Further, for a device that can be remotely controlled only by the IR remote-control system, the remote-control server converts the operation-command signal transmitted from the IP-remote controller via the LAN into a signal in the command format used for performing IR communications such as SIRCS, and performs optical communications. If the device for control is on a blind spot from the stand point of the remote-control server, and the distance between the IR device and the remote-control server is long, it may be configured that the infrared-command signal is transmitted in the vicinity of the device for control through optical communications by using an extension cord such as the AV mouse.

Figure 2:
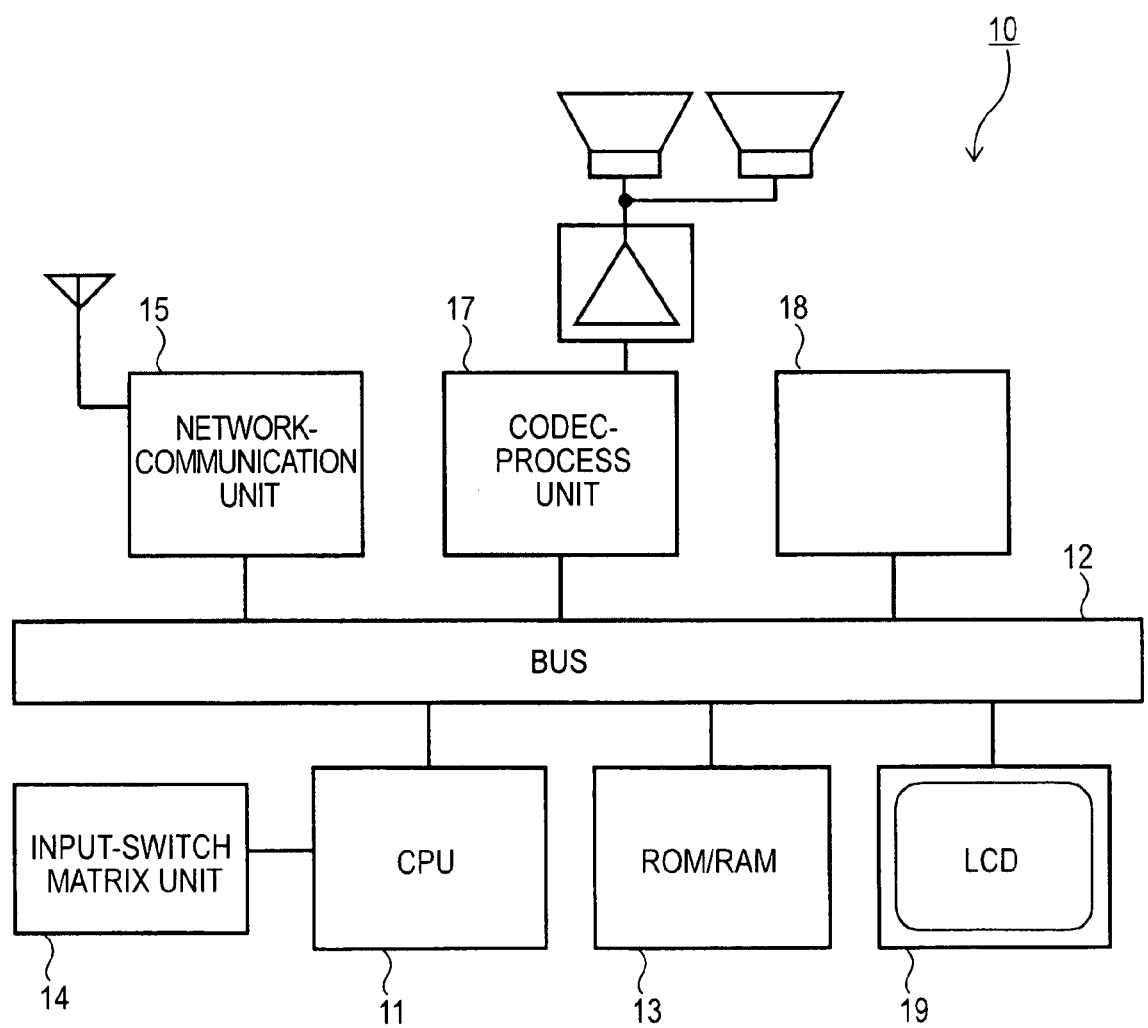
FIG. 2 shows the hardware configuration of an example terminal device that can operate, as an IP-remote controller.

FIG. 2 shows the hardware configuration of an example terminal device that can operate, as the IP-remote controller, in a remote-control system of the first embodiment. Although the terminal device shown in FIG. 2 can be formed, as a terminal expressly meant for the IP-remote controller, the terminal device can be designed so that the terminal device can also function, as a mobile terminal of a different type, such as a personal digital assistant (PDA), a game machine, and so forth.

In an IP-remote controller 10 shown in FIG. 2, a central processing unit (CPU) 11 controls each of units via a bus 12.

The CPU 11 has a memory unit 13 including a read-only memory (ROM) and/or a random-access memory (RAM), expands a program code stored in the ROM on the RAM, and performs predetermined processing. The predetermined processing may be command-and-response processing for a control signal transmitted between a device for control and the CPU 11 via the remote-control server, transmitting and/or receiving contents between the CPU 11 and the device for control, file transfer, remote control of the device for control such as a DLNA device, an IR device, and so forth. The CPU 11 performs the above-described predetermined processing according to a request signal transmitted from a user.

An input-switch matrix unit 14 has a key-operation unit including a ten-key pad, a speech-adjustment key, an image-quality-adjustment key, a tuning key, and so forth so that the user transmits information about operations performed for a device which is remotely controlled. A command signal transmitted from the input-switch matrix unit 14, such as a command signal used for operating the device for control, is transmitted from a network-communication unit 15 via the IP network.

The network-communication unit 15 includes a network interface used for performing communications with the AP via a radio network formed by IEEE 802. 11 a/b/g or the like. Identifier information which is unique on the network, such as a message-authentication-code (MAC) address and an IP address is set to the network-communication unit 15. According to the first embodiment, the network-communication unit 15 transmits a remote-control request generated on the basis of a request transmitted via the input-switch matrix unit 14 to the device for control via the remote-control server.

A codec-processing unit 17 encodes and decodes AV contents. In the first embodiment, the codec-processing unit 17 decodes AV contents transmitted from the device for control to the network-communication unit 15 so that speech data and video data can be reproduced and output. For example, a TV receiver controlled by the IP-remote controller distributes video data such as information about a child screen transmitted thereto to the IP-remote controller via the IP network so that the user can enjoy the child screen on a display screen of the IP-remote controller. Here, when the IP-remote controller is not configured to transmit AV contents, the codec-processing unit 17 may not have the encoding function.

A graphic-display processor (GDP) 18 processes drawing data which will be produced on a liquid-crystal-display (LCD) unit 19 and performs drive control for the LCD unit 19. For example, a video signal decoded by the codec-processing unit 17 is produced on a screen of the LCD unit 19 by the GDP 18. Further, the GDP 18 makes the LCD 19 produce a user interface used for operating the device for control on the basis of the device information acquired from the device for control, the device being connected to the network.

Figure 3:
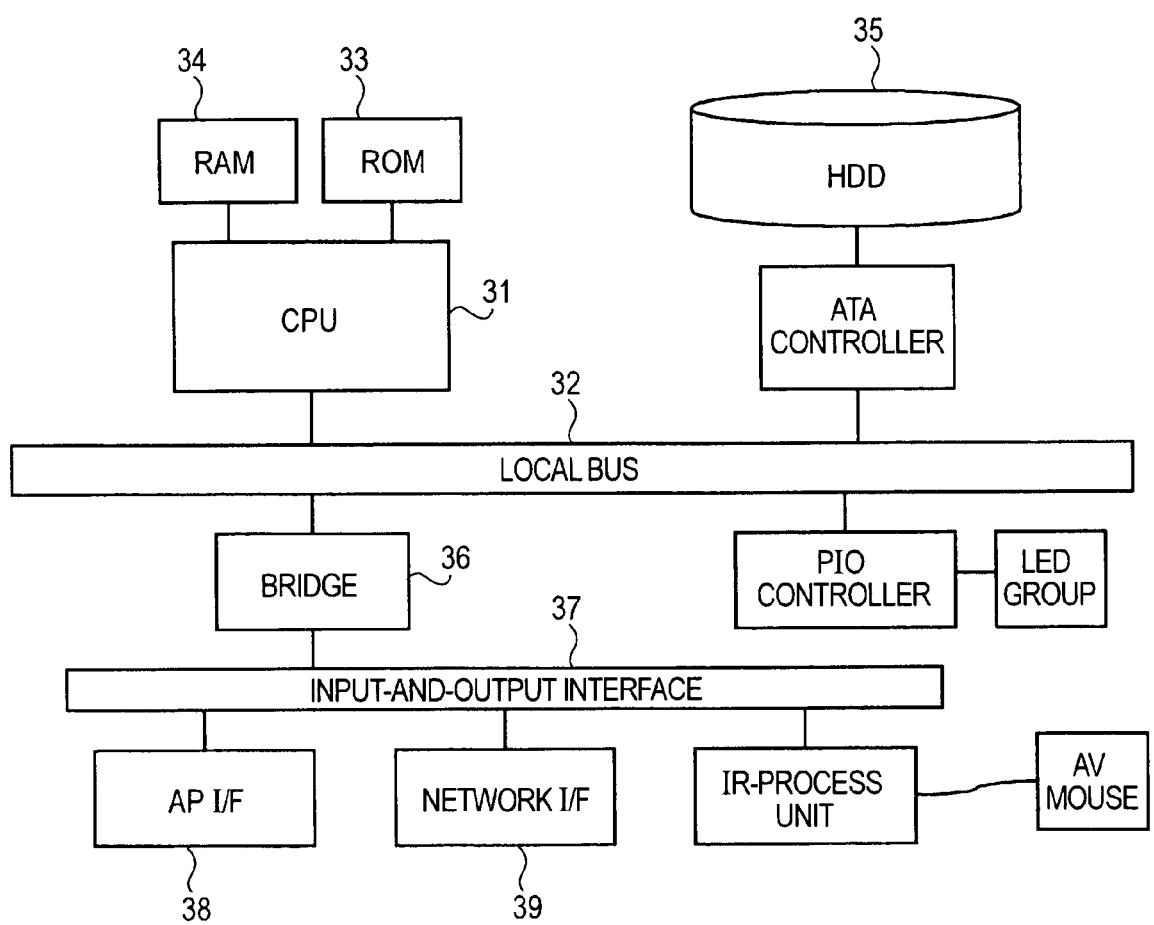
FIG. 3 schematically shows the configuration of a device which operates, as a remote-control server.

FIG. 3 schematically shows the configuration of a device which functions, as the remote-control server in the remote-control system of the first embodiment. The remote-control server is connected to, or integrated into an AV device such as a TV receiver controlled by the IP-remote controller.

In a remote-control server 30 shown in FIG. 3, a CPU 31 controls each of units via a local bus 32.

The CPU 31 has a memory unit including a read-only memory (ROM) 33 and/or a random-access memory (RAM) 34, expands a program code stored in the ROM 33 onto the RAM 34, and performs predetermined processing. The program code may be, for example, a "meta-information-management program" adapted to manage DLNA devices that can be accessed in the home network, as "the list of content-providing devices" and manage meta information about contents provided by content-provide devices capable of DLNA.

An integrated-drive-electronics (IDE) hard-disk unit 35 and/or at least one different external storage unit is connected to the local bus 32 via an AT-attachment (ATA) controller by using an AT-attachment-packet interface (ATAPI). The hard-disk unit 35 stores the information shown as "the list of content-providing devices" used for managing the DLNA devices accessible in the home network, the meta information about each of the contents provided on the home network by the DLNA-capable content-providing devices, and so forth. However, the hard-disk unit 35 may not be required, so as to store the above-described information. Namely, an unvolatile semiconductor storage unit such as a flash memory, the RAM 34, and so forth can be used for storing the above-described information.

The remote-control server 30 stores the meta information about each of contents provided by the content-provide devices in behalf of the content-providing devices. Therefore, when the power of any one of the content-providing devices is turned off, the remote-control server 30 can achieve the function of showing the list of contents provided on the home network to the IP-remote controller, which is the content-use device, which will be described later in detail.

Further, various peripheral devices can be provided on the local bus 32. For example, a parallel input-and-output (PIO) controller configured to drive a light-emitting-diode (LED) indicator which shows information about the operation state of each device is provided.

Further, an input-and-output interface 37 is connected to the local bus 32 via a bridge 36. An AP interface 38 which performs radio communications via an access point of an unwired LAN and a wired-LAN-communication unit 39 which performs communication operations on a wired LAN such as Ethernet (Registered Trademark) are provided on the input-and-output interface 37. Subsequently, a command-reception and/or response-reply sequence can be performed between the remote-control server 30 and the IP-remote controller 10 via the AP interface 37. Further, a request-transmission and/or response-reception sequence can be performed between the remote-control server 30 and a network-capable AV device according to a command signal transmitted from the IP-remote controller 10.

Further, the input-and-output interface 37 includes an infrared (IR) processing unit. Further, for an IR device that can be remotely controlled only by a known IR remote-control system, the IR-processing unit converts an operation-command signal transmitted from the IP-remote controller via the LAN into a signal in the command format used for performing IR communications such as SIRCS, and performs optical communications using an IR ray, as a medium. If the IR device for legacy control is on a blind spot from the stand point of the remote-control server, and the distance between the device for legacy control and the remote-control server is long, it may be configured that the command signal is transmitted by using the AV mouse. Then, the infrared-command signal is transmitted in the vicinity of the device for legacy control through optical communications.

Figure 4:
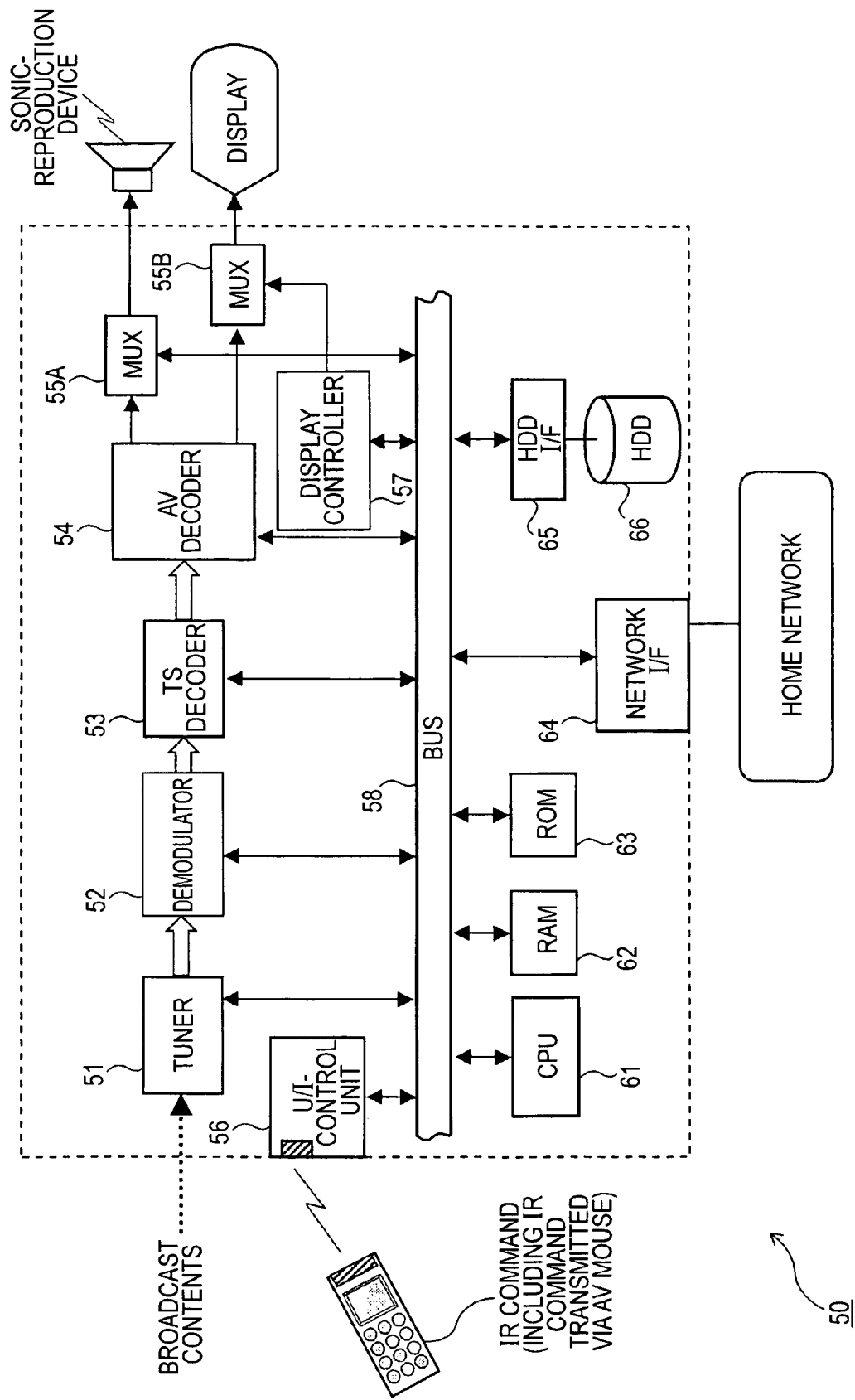
FIG. 4 schematically shows the configuration a device which operates, as a content-provide device.

FIG. 4 schematically shows the configuration of a device that can operate, as a content-provide device in the remote-control system of the first embodiment. In FIG. 4, the content-provide device is configured, as a network-capable hard-disk recorder that can select and receive, and record broadcast contents provided by TV broadcast or the like.

A broadcast wave received by an antenna (not shown) is transmitted to a tuner 51. Although the broadcast wave is in a predetermined format, it is not limited to the above-described satellite-delivered broadcast wave. Namely, the broadcast wave may be a cable-broadcast wave, a terrestrial-broadcast wave, and so forth. The tuner 51 selects the broadcast wave of a predetermined channel according to an instruction transmitted from a CPU 61 and transmits reception data to a demodulator 52 which follows the tuner 51. The demodulator 52 demodulates the reception data subjected to digital modulation.

The demodulated digital data is transport stream (TS) including AV data and program information that are compressed according MPEG 2 system or the like, where the AV data and the program information being superimposed on each other. The AV data includes video information, speech information, and subtitle data that form the main body of a broadcast program. The program information denotes data attached to the main body of the broadcast program and used, as an electronic-program guide (EPG), or for making reservation of video recording of the program.

A TS decoder 53 interprets the above-described TS and separates the TS into AV data and program information that are compressed according to MPEG2 system. Further, the TS decoder 53 transmits the compressed AV data to an AV decoder 54 and the compressed program information to the CPU 61 via a bus 58. Upon receiving the compressed real-time AV data transmitted from the TS decoder 53, the AV decoder 54 separates the data into a compressed video data and compressed speech data. Then, the AV decoder 54 decompresses the compressed video data according to MPEG 2 system and reproduces an original video signal. Further, the AV decoder 54 performs pulse-code-modulation (PCM) decoding for the compressed speech data and merges the decoded video data with an additional speech signal, so as to generate a reproduced speech signal. The reproduced video signal is produced on a display unit via a multiplexer 55B, as an image and the reproduced speech signal is transmitted to a sonic-reproduction device via a multiplexer 55A, as speech. As for broadcast contents of a program for which video recording is reserved, compressed video data and compressed speech data are not decompressed, transferred to a hard-disk unit 66 via a bus 50, and recorded therein. If the user wishes to watch the program, the compressed video data and speech data are read from the hard-disk device 66, decompressed by the AV decoder 54, and reproduced and output.

A user-interface-control unit 56 is provided, as a module configured to process an input operation performed by the user. For example, the user-interface-control unit 56 includes a key-matrix unit (not shown) including an operation button and/or switch used by the user so that the user can manually operates the user-interface-control unit 56 directly, and a function of receiving an infrared-remote-control command signal. The user can perform content operations including broadcast-program selection, video recording, video-recording reservation, reproduction, deletion of a recorded program, and so forth via the remote controller and the user-interface-control unit 56.

The CPU 61 is a main controller which controls operations of the entire content-provide unit 50. Further, the CPU 61 performs processing operations including video recording, video-recording reservation, and reproduction of program information transmitted thereto via the bus 58.

A RAM 62 is a writable volatile-memory unit used for loading an execution-program code of the CPU 61, writing work data of the execution-program code, and so forth. Further, a ROM 63 is a read-only memory configured to permanently store a self-diagnosis and/or initialization program executed when the power of the content-provide device 50 is turned on and/or a micro code used for operating hardware.

A network interface 64 connects the content-provide device 50 to an IP network such as a home network and performs LAN-communication operations according to a predetermined communication protocol including Ethernet (Registered Trademark) or the like.

A hard-disk drive (HDD) 66 is an external storage unit which accumulates a program and/or data, as a file in a predetermined format and has a relatively large capacity of about several ten to several hundred GB. The HDD 66 is connected to the bus 58 via the hard-disk interface 65.

A display controller 57 is a purpose-built controller configured to control produced and output information such as broadcast-program information provided according to data-broadcast contents.

The content-provide device 50 controls tuning operations of the tuner 51, performs display control for program information, and so forth, according to a command signal transmitted from the user via the home network and/or the user-interface control unit 56. The CPU 61 processes and converts program information transmitted from the TS decoder 53 into data for display and transmits the converted data to the display controller 57. The display controller 57 generates an image signal of the program information on the basis of the display data and transmits the generated image signal to the multiplexer 55B. The CPU 61 processes speech data included in the program information and transmits the speech data to the multiplexer 55A via the bus 58. The multiplexers 55A and 55B superimpose the display data and the speech data that are transmitted from the CPU 11 on the video data and the speech data (and the subtitle data), that is, the main body of a broadcast program, transmitted from the AV decoder 54. Further, the multiplexers 55A and 55B externally transmit the superimposed data to a display and the sonic-reproduction device.

The remote-control server 30 stores meta information of contents provided by the above-described content-provide device in behalf of the content-provide unit. That is to say, the remote-control server 30 functions, as a meta-information server. Therefore, when the power of the content-provide device is turned off, the remote-control server 30 can achieve the function of showing the list of contents provided on the home network for the content-use device which uses contents.

Hereinafter, an operation sequence performed by the remote-control server 30 will be described. The operation sequence is performed, so as to show the list of contents to a content-use device which issues a request for contents in a system including the content-use device, a remote-control server, and a content-provide device that are connected to one another via a radio-communication network and a home network.

Here, the term "content-provide device" may be a content record-and-provide device including an HDD recorder, a CD recorder, and so forth, and/or a content-provide device such as a CD player. Further, the term "content-use device" denotes a content-reproduce device including an IP-remote controller having a content-reproduction function, a monitor display, and so forth, and a content record-and-reproduce device that can record and reproduce contents, as the HDD recorder can.

In the following operation sequence, the power of the remote-control server (and the AP) is always turned on so that the remote-control server is usable at all time. However, the power of each of other devices including the IP-remote controller, the content-provide device, and so forth is turned on, as required. Namely, the power of each of the other devices is shut off when the user does not wish to use the device.

Figure 5:
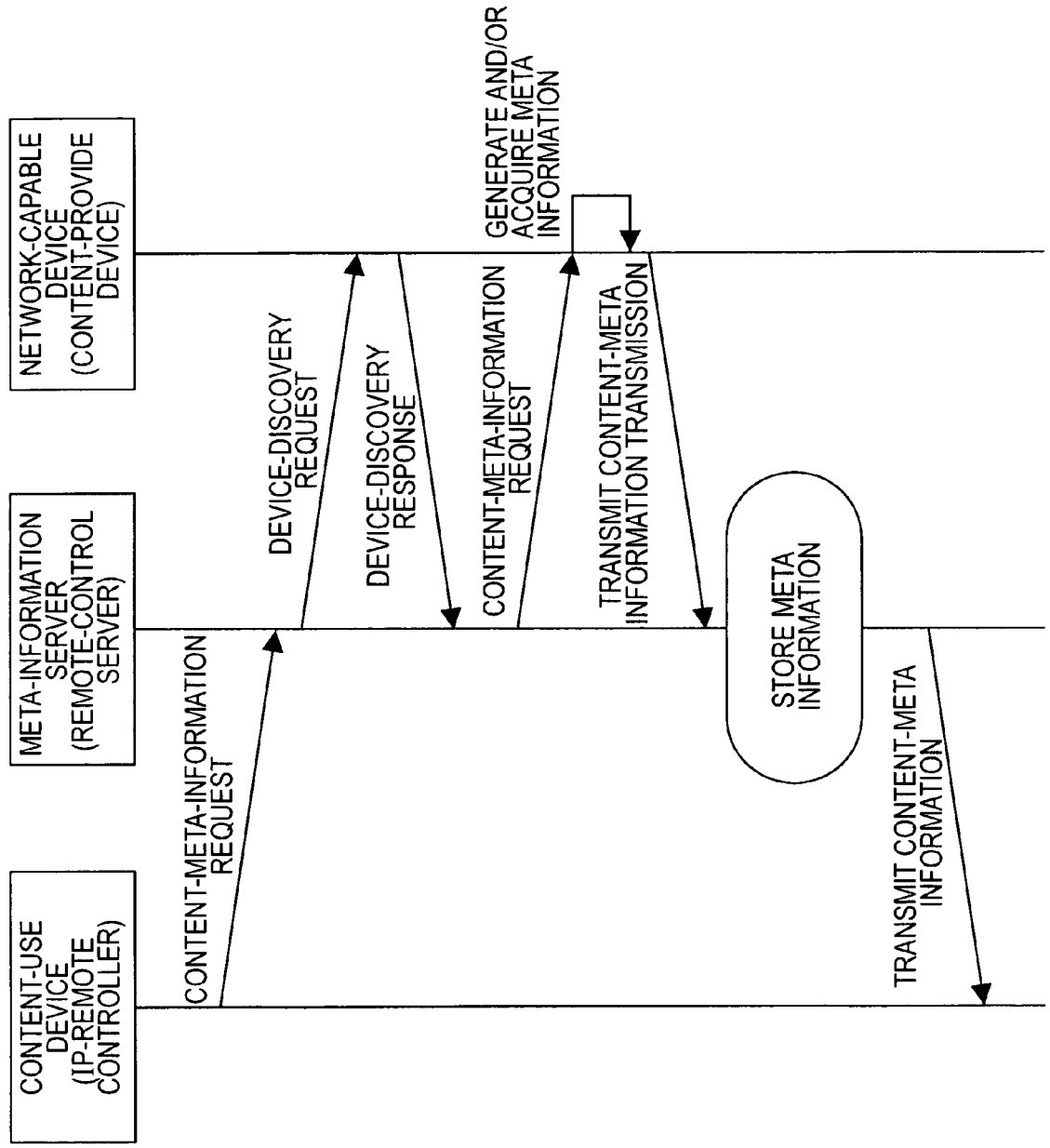
FIG. 5 shows an example operation sequence performed by the remote-control server, so as to provide the list of contents to the IP-remote controller.

FIG. 5 shows an example operation sequence performed by the remote-control server functioning as the meta-information server, so as to show the list of contents to the content-use device, when all of the remote-control server, the content-use device which issues a request for contents, and the content-provide device which provides the contents are usable.

Before using contents, the content-use device issues a request for meta information relating to contents that can be used on the home network on the radio-communication network.

Upon receiving the request for the content-meta information transmitted via the AP, the remote-control server functioning, as the meta-information server, transmits a request to discover a network (DLNA)-capable device on the home network in response to the content-meta-information request. Upon receiving the discovery request, the network-capable device transmits a device-discovery response to the remote-control server.

Then, the remote-control server transmits a request for meta information relating to the contents to the network-capable device which transmitted the device-discovery response. If the network-capable device is a content-provide device, the network-capable device generates and/or acquires meta information relating to contents that can be provided in response to the meta-information request, and transmits the content-meta information to the remote-control server. The content-meta information includes information about the title and/or synopsis of the contents and reference information of the content-provide device (store position). The meta information may be attached to contents in advance. Otherwise, the content-provide device extracts predetermined information from the contents and generates the meta information. Further, the content-meta information may be acquired from other information resources.

Although FIG. 5 shows a single content-provide device, as a network-capable device for the sake of simplicity, the system may include two or more content-provide devices provided on the home network. In that case, a device-discovery response is transmitted from each of the content-provide devices and the remote-control server issues a request for meta information to each of the content-provide devices. Of course, a network-capable device other than the content-provide device may be provided on the home network.

Then, the remote-control server classifies and stores the acquired meta information, and transmits the meta information to the content-use device which is the request source. The content-use device produces and outputs an image of the meta information, so as to show the list of contents that can be obtained on the home network.

Figure 6:
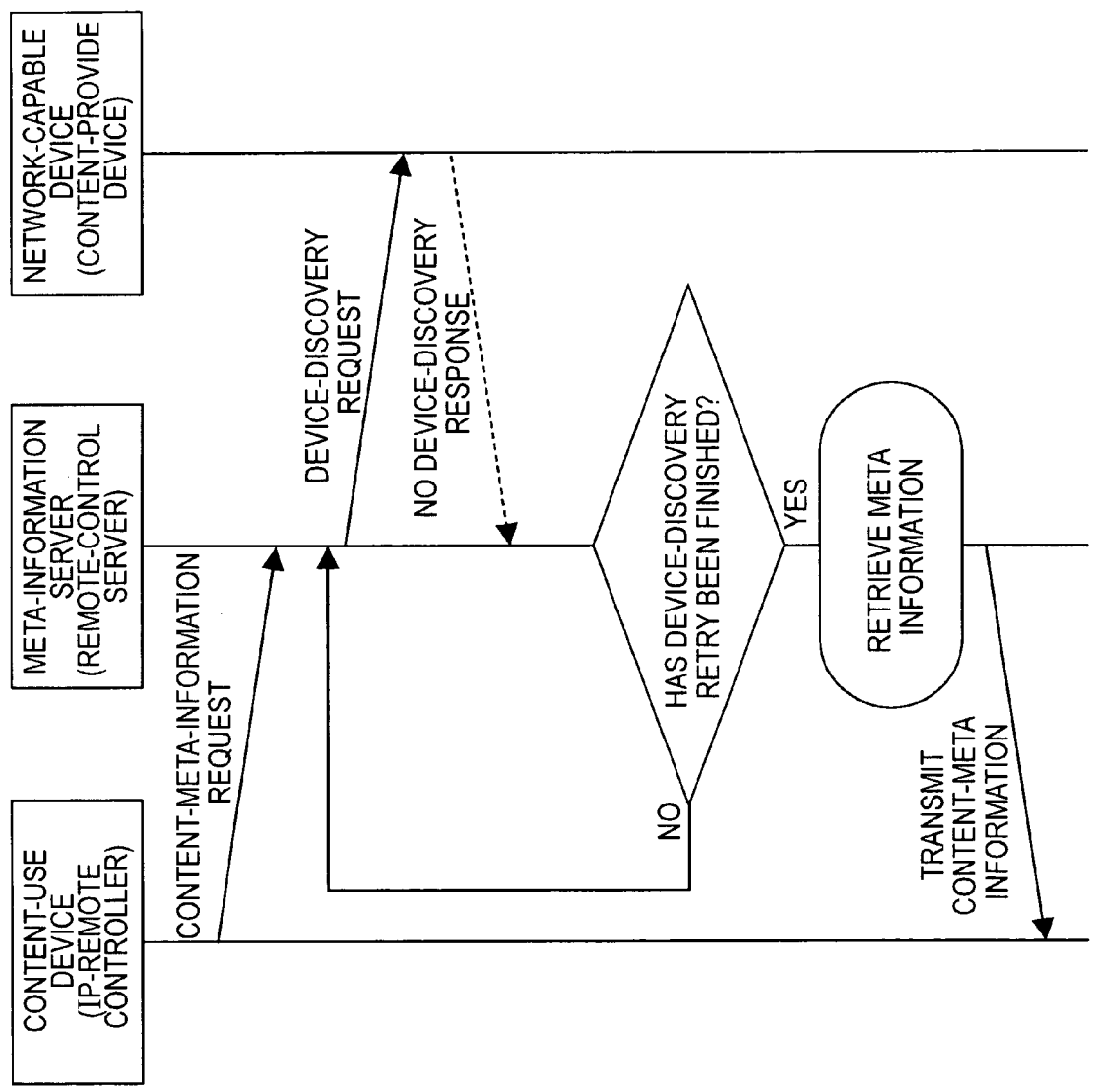
FIG. 6 shows another example operation sequence performed by the remote-control server, so as to provide the list of contents to the IP-remote controller.

FIG. 6 shows another example operation sequence performed by the remote-control server functioning as the meta-information server, so as to show the list of contents to a content-use device when all of the remote-control server, the content-use device which issues a request for contents, and a content-provide device which provides the contents are usable. According to FIG. 6, a network-capable device for which a device-discovery request had been issued does not transmit a device-discovery response. The reason why the network-capable device does not transmit the device-discovery response is that the power of the network-capable device is turned off, because the network-capable device is not currently used, or the network-capable device is removed from the home network (the movement of device), for example.

Before using contents, the IP-remote controller issues a request for meta information relating to contents that can be used on the home network on the radio-communication network.

Upon receiving the request for the content-meta information via the AP, the remote-control server transmits a request to discover a network (DLNA)-capable device on the home network in response to the content-meta-information request. Upon receiving the device-discovery request, the network-capable device transmits a device-discovery response to the remote-control server.

If a network-capable device which transmitted the device-discovery response when the previous device-discovery processing was performed does not transmit a device-discovery response this time, because the power of the network-capable device is shut down, for example, the remote-control server makes a retry, so as to discover a device. When the number of retries exceeds a predetermined value, or a retry-time period times out, the remote-control server gives up discovering the device.

In that case, it is difficult for the remote-control server to acquire the latest meta information. Therefore, the remote-control server transmits meta information that had been acquired and stored in place of the latest meta information. A content-use device produces and outputs an image of the meta information, so as to show the list of contents provided on the home network.

Figure 7:
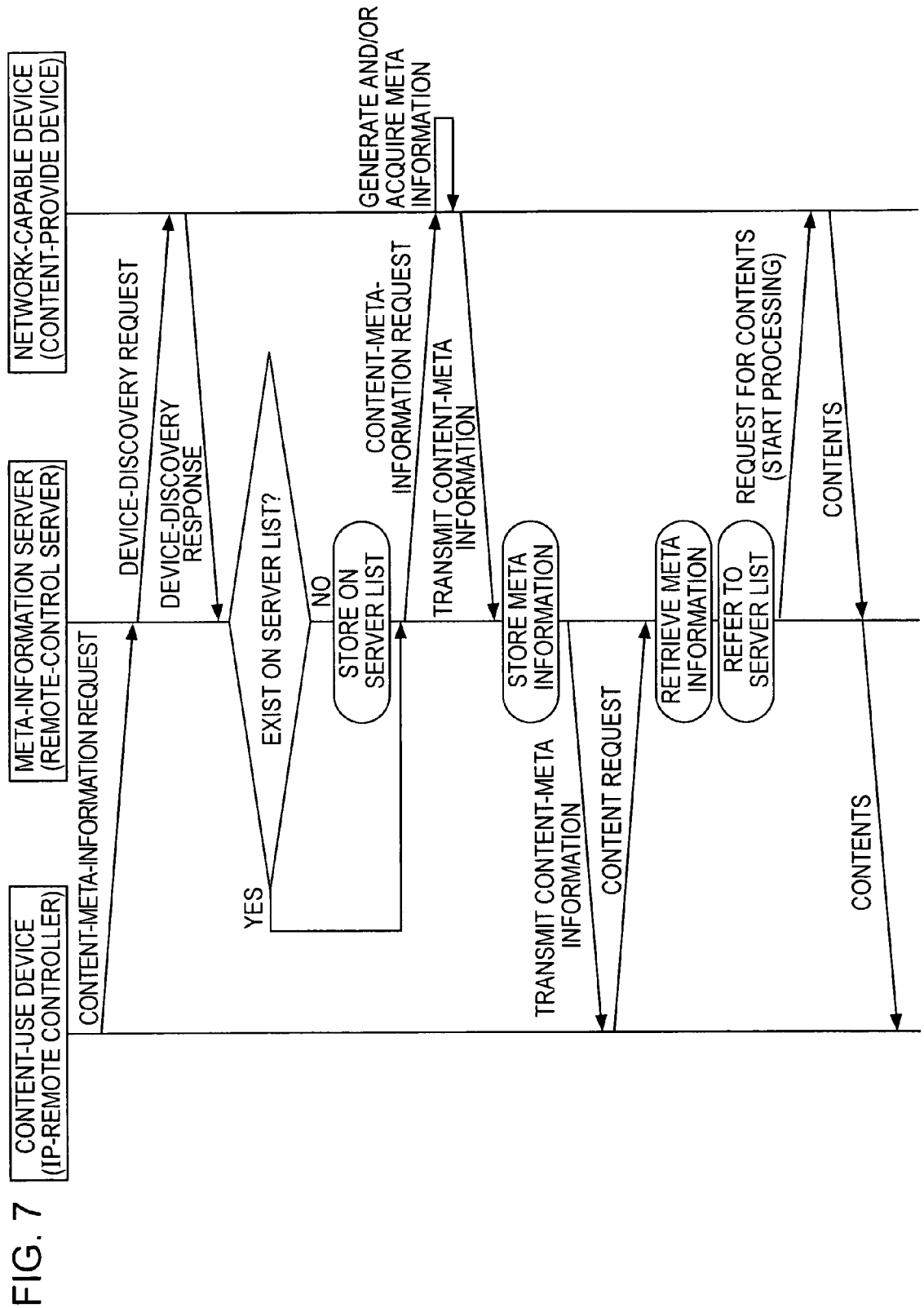
FIG. 7 shows still another example operation sequence performed by the remote-control server, so as to provide the list of contents to the IP-remote controller.

FIG. 7 shows still another example operation sequence performed by the remote-control server functioning as the meta-information server, so as to show the list of contents to the content-use device when all of the remote-control server, the content-use device which issues a request for contents, and the content-provide unit which provides the contents are usable. A network-capable device for which a device-discovery request had been issued does not transmit a device-discovery response. The reason why the network-capable device does not transmit the device-discovery response is that the power of the network-capable device is turned off, because the network-capable device is not currently used, or the network-capable device is moved. In the case of FIG. 7, the remote-control server stores information about a device that had been discovered on the list of content-provide devices, so as to control the state (the power-on state or the like) of each of the content-provide devices according to whether or not a device-discovery response is transmitted.

Before using contents, the IP-remote controller issues a request for meta information relating to contents that can be used on the home network on the radio-communication network.

Upon receiving the content-meta-information request via the AP, the remote-control server transmits a request to discover a network (DLNA)-capable device on the home network in response to the content-meta-information request. Upon receiving the device-discovery request, the network-capable device transmits a device-discovery response to the remote-control server.

The remote-control server updates the details on the list of the content-provide devices according to whether or not the device-discovery response is transmitted. That is to say, if the device-discovery response is transmitted from a network-capable device that had been discovered, the remote-control server changes the state of the network-capable device into "power is turned on (or the network-capable device is usable)" on the list of the content-provided devices. If the device-discovery response is not transmitted from the network-capable device that had been discovered, the remote-control server determines the state of the network-capable device to be "power is shut down (or the network-capable device is not usable)" on the list of the content-provided devices. Further, if a device-discovery response is transmitted from a network-capable device of which information is not recorded on the list of the content-provide devices, the remote-control server records the device information on the list for the first time and determines the state of the device to be "power is turned on (or the device is usable)".

Then, the remote-control server transmits a request for meta information relating to the contents to each of the network-capable devices that transmitted the device-discovery responses. If the network-capable device is the content-provide device, the network-capable device generates and/or acquires meta information relating to contents that can be provided in response to the meta-information request, and transmits the content-meta information to the remote-control server. The content-meta information includes information about the title and/or synopsis of the contents and reference information of the content-provide device (store position).

Then, the remote-control server updates the meta information that had been stored on the basis of the newly acquired meta information and transmits the latest meta information to the content-use device which is the request source.

The content-use device produces and outputs an image of the meta information so that the list of contents that can be obtained on the home network is shown. Then, the user can request to use the contents via the content-use device such as the IP-remote controller.

Upon receiving the content request, the remote-control server refers to the meta information of the contents and determines the content-provide device storing the contents. Further, the remote-control server refers to the list of content-provide devices, and determines whether or not the power of the determined content-provide device is turned on.

When the content-provide device storing the requested contents is usable, the remote-control server transmits a request for the contents to the usable content-provide device. Then, the content-provide device transmits the requested contents to the IP-remote controller which is the request source via the AP, by performing stream distribution or the like.

If the power of the content-provide device storing the requested contents is shut down, the remote-control server performs start processing for the above-described content-provide device. The above-described start processing may be device-wake-up processing performed via the network, or producing a prompt, so as to make the user perform an operation manually. When the content-provide device can be remotely controlled by using an IR-remote-control system, a command signal used for IR communications such as SIRCS may be transmitted by performing optical communications. If a device for control is on a blind spot from the stand point of the remote-control server and/or the distance between the device for control and the remote-control server is long, when the IR-command signal is transmitted, it may be configured that the infrared-command signal is transmitted in the vicinity of the device for control through optical communications by using an extension cord such as the AV mouse.

When the power of the above-described content-provide device is turned on so that the content-provide device becomes usable, the remote-control server transfers the request for contents to the content-provide device. Then, the content-provide device transmits the requested contents to the content-use device which is the request source via the AP, by performing stream distribution or the like.

Figure 8:
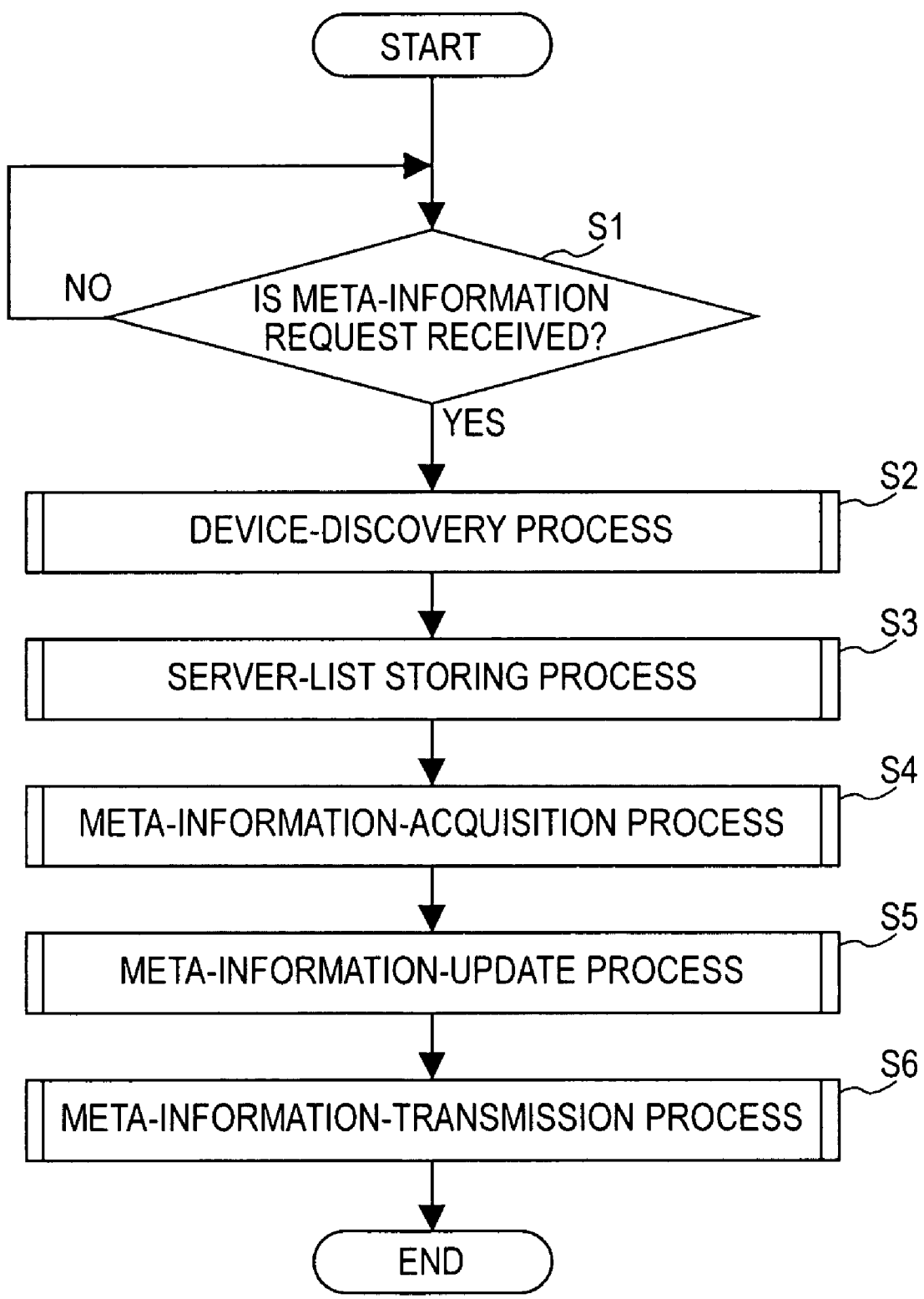
FIG. 8 is a flowchart showing processing procedures performed by the remote-control server, so as to achieve the operation sequence shown in FIG. 7.

FIG. 8 is a flowchart illustrating processing procedures performed by the remote-control server, so as to achieve the operation sequence shown in FIG. 7.

When the remote-control server receives a request for content-meta information via the AP, at step S1, processing for discovering a network (DLNA)-capable device is performed on the home network in response to the received content-meta-information request, at step S2.

The processing procedures performed for discovering the network-capable device includes the steps of transmitting a device-discovery request on the home network and receiving a device-discovery response transmitted from the network-capable device that received the device-discovery request.

Then, the remote-control server updates the list of content-provide devices according to a response result obtained by performing the device-discovery processing, at step S3.

If the device-discovery response is transmitted from a network-capable device that had been discovered, the remote-control server determines the state of the network-capable device to be "power is turned on (or the network-capable device is usable)" on the list of the content-provided devices. If the device-discovery response is not transmitted from the network-capable device that had been discovered, the remote-control server determines the state of the network-capable device to be "power is shut down (or the network-capable device is not usable)" on the list of the content-provided devices. Further, if the device-discovery response is transmitted from a network-capable device of which information is not recorded on the list of the content-provide devices, the remote-control server records the device information on the list for the first time and determines the state of the device to be "power is turned on (or the device is usable)".

Then, the remote-control server acquires meta information relating to the contents provided on the home network, at step S4.

At step S4, the remote-control server transmits a request for meta information relating to the contents to each of the network-capable devices that transmitted the device-discovery responses. If the network-capable device is a content-provide device, the network-capable device generates and/or acquires meta information relating to contents that can be provided in response to the meta-information request, and transmits the content-meta information to the remote-control server.

The content-meta information includes information about the title and/or synopsis of the contents and reference information of the content-provide device (store position). The remote-control server updates stored meta information on the basis of the newly acquired meta information, at step S5. Then, the remote-control server transmits the latest meta information to the content-use device which is the request source, at step S6.

In addition to acquiring and updating the content-meta information on the basis of a request transmitted from the content-use device such as the IP-remote controller, the remote-control server may transmit a request for meta information to the content-provide device and update the details on the meta information for each meta-information request so that the remote-control server can store the latest information at all times. In another case, when a change occurs in contents stored in the content-provide device, the content-provide device may inform the remote-control server of details on meta information which is changed due to the above-described content change every time the change occurs in the contents.

Thus, according to the remote-control system of the first embodiment, the remote-control server stores meta information of contents and provides first information used by a user so that the user can obtain desired contents. Therefore, by providing a system configured to manage the content-meta information independently of a content-provide device, it becomes possible to provide the content-meta information within the remote-control system irrespective of the state of the content-provide device storing the contents. Subsequently, it becomes possible to provide desired contents only by activating minimum part of the remote-control system.

It should be understood by those skilled in the art that various modifications, combinations, sub-combinations and alterations may occur depending on design requirements and other factors insofar as they are within the scope of the appended claims or the equivalents thereof.

What is claimed is:

1. A content-information-management system comprising:

a meta-information server that handles meta information of contents on a network on which at least one content-providing device provides the contents, wherein the meta-information server provides the meta information to a content-use device which uses the contents, wherein the meta-information server converts an internet-protocol command received via a wired local area network into an infrared command for controlling a device that can be controlled by the infrared command, and wherein the meta-information server:

discovers the at least one content-providing device on the network, acquires and stores the meta information of the contents provided by each of the at least one discovered content-providing device, and transmits the meta information of the contents according to a request for the contents, the request being made by the content-use device, and wherein the meta-information server initiates the device-discovery processing for the at least one content-providing device on the network according to a request for the meta information, the request being transmitted from the content-use device, and attempts to acquire the latest meta information.

2. The content-information-management system according to claim 1, wherein where no device-discovery response is transmitted from the content-providing device, the meta-information server transmits meta information that was previously acquired from the content-providing device and that is stored to the content-use device.

3. A content-information-management system comprising:

a meta-information server that handles meta information of contents on a network on which at least one content-providing device provides the contents, wherein the meta-information server provides the meta information to a content-use device which uses the contents, wherein the meta-information server converts an internet-protocol command received via a wired local area network into an infrared command for controlling a device that can be controlled by the infrared command, and wherein the meta-information server:

discovers the at least one content-providing device on the network, acquires and stores the meta information of the contents provided by each of the at least one discovered content-providing device, and transmits the meta information of the contents according to a request for the contents, the request being made by the content-use device, and wherein the meta-information server includes information about a list of the at least one content-providing device, the list information being provided, to manage the at least one content-providing device which transmits the device-discovery response for a device-discovery request and the state of the at least one content-providing device.

4. The content-information-management system according to claim 3, wherein the meta-information server requests the contents, in response to the content-request made by the content-use device, by determining the content-providing device which provides the contents on the basis of the meta information of the contents for which the content request is made.

5. The content-information-management system according to claim 3, wherein when the meta-information server transmits a request for the contents to the content-providing device, the meta-information server confirms the state of the content-providing device by referring to the list information.

6. The content-information-management system according to claim 3, wherein when a power of the content-providing device, which is a destination of the content request, is shut down, the meta-information server performs predetermined start processing, and transmits the content request.

7. The content-information-management system according to claim 6, wherein the meta-information server performs the start processing for the content-providing device whose power is shut down via the network.

8. The content-information-management system according to claim 6, wherein where the content-providing device whose power is shut down is ready for infrared communications, the meta-information server performs the start processing by using an infrared-command signal.

9. The content-information-management system according to claim 8, wherein the meta-information server uses an extension cord to transmit the infrared-command signal.

10. A content-information-management apparatus configured to handle meta information relating to contents on a network on which at least one content-providing device which provides the contents is provided, the content-information-management apparatus comprising:

device-discovery means for discovering the at least one content-providing device provided on the network;

meta-information-acquisition means for acquiring and storing the meta information of the contents provided by each of the at least one discovered content-providing device;

interface means for converting an internet-protocol command received via a wired local area network into an infrared command for controlling a device that can be controlled by the infrared command; and meta-information-providing means for transmitting and providing the meta information stored by the meta-information-acquisition means according to a request for the contents, the request being made by a content-use device which uses the contents, wherein the device-discovery means initiates the discovery processing for the at least one content-providing device on the network according to a request for the meta information, the request being made by the content-use device, and wherein the meta-information-acquisition means attempts acquisition of the latest meta information from the at least one content-providing device which transmits a response to the device-discovery processing.

11. The content-information-management apparatus according to claim 10, wherein where the at least one content-providing device does not transmit the device-discovery response, the meta-information-providing means transmits meta information that was previously acquired from the at least one content-providing device and that is stored to the content-use device.

12. A content-information-management apparatus configured to handle meta information relating to contents on a network on which at least one content-providing device which provides the contents is provided, the content-information-management apparatus comprising:

device-discovery means for discovering the at least one content-providing device provided on the network;

meta-information-acquisition means for acquiring and storing the meta information of the contents provided by each of the at least one discovered content-providing device;

interface means for converting an internet-protocol command received via a wired local area network into an infrared command for controlling a device that can be controlled by the infrared command;

meta-information-providing means for transmitting and providing the meta information stored by the meta-information-acquisition means according to a request for the contents, the request being made by a content-use device which uses the contents; and information about a list of the at least one content-providing device, the list information to manage the at least one content-providing device which transmits the device-discovery response for a device-discovery request and the state of the at least one content-providing device.

13. The content-information-management apparatus according to claim 12, further comprising content-request means for requesting the contents, in response to the content request of the content-use device, by determining the content-providing device which provides the contents on the basis of the meta information of the contents for which the content request is made.

14. The content-information-management apparatus according to claim 13, wherein where the content-request means transmits a request for the content to the content-providing device, the content-request means confirms the state of the content-providing device by referring to the list information.

15. The content-information-management apparatus according to claim 14, wherein where a power of the content-providing device for which the content request is made is shut down, the content-request means performs predetermined start processing, and transmits the content request.

16. The content-information-management apparatus according to claim 15, wherein the content-request means performs the start processing for the content-providing device whose power is shut down via the network.

17. The content-information-management apparatus according to claim 15, wherein where the content-providing device whose power is shut down is capable of infrared communications, the content-request means performs the start processing by using an infrared-command signal.

18. The content-information-management apparatus according to claim 17, wherein the content-request means uses an extension cord to transmit the infrared-command signal.

19. A content-information-management method adapted to handle meta information relating to contents on a network on which at least one content-providing device provides the contents, the content-information-management method comprising the steps of:

discovering the at least one content-providing device provided on the network;

converting an internet-protocol command received via a wired local area network into an infrared command for controlling a device that can be controlled by the infrared command;

acquiring and storing the meta information of the contents provided by each of the at least one discovered content-providing device; and transmitting and providing the meta information stored at the meta-information-acquisition step according to a request for the contents, the request being made by a content-use device which uses the contents, wherein the device-discovery processing performed for the at least one content-providing device on the network according to the device-discovery step is initiated in response to a request for the meta information, the request being made by the content-use device, and wherein, at the meta-information-acquisition step, a trial is made, to acquire the latest meta information from the at least one content-providing device which transmits a response to the device-discovery processing.

20. The content-information-management method according to claim 19, wherein where the at least one content-providing device does not transmit the device-discovery response, the meta information previously acquired from the at least one content-providing device and that is stored is transmitted to the content-use device, at the meta-information-providing step.

21. A content-information-management method adapted to handle meta information relating to contents on a network on which at least one content-providing device provides the contents, the content-information-management method comprising the steps of:

discovering the at least one content-providing device provided on the network;

converting an internet-protocol command received via a wired local area network into an infrared command for controlling a device that can be controlled by the infrared command;

acquiring and storing the meta information of the contents provided by each of the at least one discovered content-providing device;

transmitting and providing the meta information stored at the meta-information-acquisition step according to a request for the contents, the request being made by a content-use device which uses the contents; and controlling information about a list of the at least one content-providing device, to manage the at least one content-providing device which transmits the device-discovery response for a device-discovery request and the state of the at least one content-providing device on the list.

22. The content-information-management method according to claim 21, further comprising the step of requesting the contents, in response to the content request made by the content-use device, by determining the content-providing device which provides the contents on the basis of the meta information of the contents for which the content request is made.

23. The content-information-management method according to claim 22, wherein where the content request is transmitted to the content-providing device, the state of the content-providing device is confirmed by referring to the list information, at the content-request step.

24. The content-information-management method according to claim 23, wherein when power of the content-providing device for which the content request is made is shut down, predetermined start processing is performed, and the content request is transmitted, at the content-request step.

25. The content-information-management method according to claim 24, wherein the start processing is performed via the network for the content-providing device whose power is shut down, at the content-request step.

26. The content-information-management method according to claim 24, wherein where the content-providing device whose power is shut down is capable of infrared communications, the start processing is performed by using an infrared-command signal, at the content-request step.

27. The content-information-management method according to claim 26,
wherein an extension cord transmits the infrared-command signal, at the content-request step.

28. A computer-readable storage medium that stores a computer program to make a computer system execute predetermined processing, so as to handle meta information relating to contents on a network on which at least one content-providing device which provides the contents, the program comprising the steps of:

discovering the at least one content-providing device provided on the network;

converting an internet-protocol command received via a wired local area network into an infrared command for controlling a device that can be controlled by the infrared command, and acquiring and storing the meta information of the contents provided by each of the at least one discovered content-providing device; and transmitting and providing the meta information stored at the meta-information-acquisition step according to a request for the contents, the request being made by a content-use device which uses the contents, wherein the device-discovery processing performed for the at least one content-providing device on the network according to the device-discovery step is initiated in response to a request for the meta information, the request being made by the content-use device, and wherein, at the meta-information-acquisition step, a trial is made, to acquire the latest meta information from the at least one content-providing device which transmits a response to the device-discovery processing.

* * * * *